Patented Sept. 9, 1941

2,255,264

UNITED STATES PATENT OFFICE 2,255,264

URANE COMPOUNDS AND A METHOD FOR PREPARING THEM

Russell Earl Marker, State College, Pa., assignor to Parke, Davis & Company, Detroit, Mich., a corporation of Michigan No Drawing. Application January 3, 1938, Serial No. 183,137

9 Claims. (Cl. 260—397.3)

The invention relates to a new class of organic carbocyclic compounds having twenty-one carbon atoms and a molecular framework of the type found in pregnane and its derivatives, but apparently differing therefrom in the manner in which the two middle carbocyclic rings of the molecule are connected with one another. The new compounds are referred to hereinafter as uranes, from the parent hydrocarbon, urane, $C_{21}H_{36}$. The invention also relates to methods for obtaining the new compounds.

It is known that compounds having twenty-one carbon atoms and belonging to the pregnane and allo-pregnane series can be isolated from pregnancy urine. These compounds have been studied and their derivatives prepared, so that it is known with more or less certainty that the pregnanes, including pregnane and allo-pregnane, have a basic molecular structure, as illustrated by the formula,

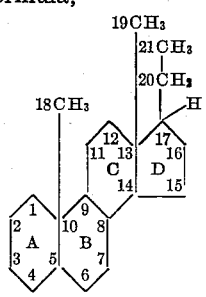

The pregnanes

In this formula for the pregnanes, the carbon atoms 8 and 9 are common to the two middle carbocyclic rings, B and C. A single hydrogen atom (not shown) is attached to each of these carbon atoms 8 and 9. The properties of the new compounds of the invention differ from those of the pregnane series in such manner as to indicate that the connection between rings B and C differs at carbon atom 9 of the urane series in being opposite to that at carbon atom 9 of the pregnane series. Hence, the difference in structure of the new urane compounds over the known pregnane type may be indicated by the following formulas:

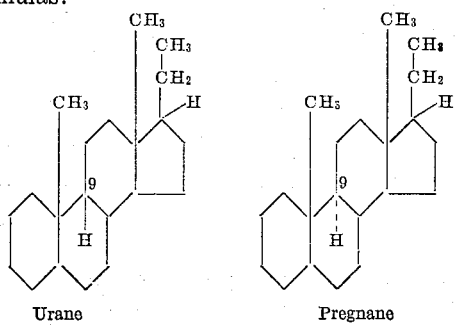

Urane          Pregnane

For convenience of visualization, the hydrogen atom at carbon atom 9 of pregnane may be considered as lying in a direction under the plane of the paper, whereas the corresponding hydrogen atom of the new urane type may be considered as lying in a direction above the plane of the paper.

I have now found that there can be isolated from pregnancy urine new compounds isomeric with the pregnane type of carbocyclic compounds but having the general formula, and being convertible into other related compounds having the general formula, as follows:

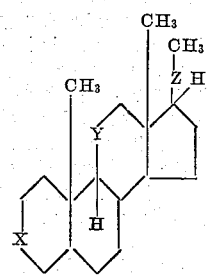

where X, Y and Z represent the same or different members of the methylene and substituted methylene group consisting of $>CH_2$, $>C=O$, and $>CHR$, R being hydroxyl (—OH) or a group which, upon hydrolysis, is converted into a hydroxyl group, such as -O-acyl, -O-alkyl, -O-aryl and halogen.

The new compounds may be obtained from pregnancy urine by various methods. For example, one may start with pregnancy urine, such as pregnant mare's urine, obtain therefrom a neutral non-phenolic carbinol fraction and then allow the latter to stand for a prolonged period of time until crystals form. The crystals can be separated out and fractionally recrystallized from a suitable organic solvent, or fractionally distilled, to give new hydroxy compounds of the urane series. A uranetriol, or tri-hydroxy urane, $C_{21}H_{36}O_3$, can be obtained by this method. There may also be obtained at the same time crystals of another tri-hydroxy compound of the formula, $C_{21}H_{36}O_3$. The latter compound, however, is a triol of the pregnane series and is more soluble in ethyl alcohol than is the uranetrial.

Since the neutral non-phenolic carbinol fraction from pregnancy urine not only contains alcohols, but also their esters, I prefer to first hydrolyze the carbinol fraction to convert any esters present into the corresponding alcohols. Aqueous alkali may be used for this hydrolysis and the alcohols can be extracted from the hydrolyzed mixture by a suitable solvent, such as benzol, and then the solvent removed from the extract. The residue is then allowed to stand, as already described, for a sufficient time to permit it to solidify and for crystals to form. The residue can also be seeded to cause more rapid formation of crystals.

Instead of isolating the hydroxy urane compounds from the neutral carbinol fraction by direct crystallization, I prefer to treat the crude mixture of alcohols, either with or without previous hydrolysis of any esters present, with an acylating agent, especially a lower carboxylic acid acylating agent, such as acetic anhydride. The mixture of acylated alcohols (esters) can then be separated in a clear-cut manner by fractional crystallization. The separated esters can then be hydrolyzed to obtain the free alcohol compounds. The hydroxy urane esters differ markedly in solubility in organic solvents from the esters of the hydroxy pregnane compounds present. The solubilities, in case of the esters, differ more than the solubilities of the corresponding free alcohols. For example, there is a greater solubility difference between urane triol tri-acetate and the acetates of the other alcohols present in the neutral carbinol fraction than there is between the corresponding free alcohols.

Example 1.—Isolation of urane triol

Non-phenolic carbinol material of mare's pregnancy urine, obtained for example during operation of the known methods for production of phenolic estrogenic hormones, is hydrolyzed with a large excess of sodium hydroxide solution and then steam-distilled for three hours to distil off the volatile material. The hydrolyzed residue from the distillation is extracted with benzol, the solvent evaporated off, and the tarry residue allowed to stand until solidification and partial crystallization has taken place. An equal volume of ether is added to the solidified mixture, and the crystalline product is then filtered off. The crystals are washed with a small amount of cold benzol and then taken up in alcohol. The alcoholic solution is treated with decolorizing or activated charcoal, or similar clarifying agent, and filtered. The alcoholic filtrate is concentrated to the point of crystallization, whereupon a product separates which upon recrystallization gives a tri-hydroxy compound, $C_{21}H_{36}O_3$, melting at 295–300° C. About 10 mgms. or more of this compound per gallon of urine are obtained. It can be identified as a tri-hydroxy urane, uranetriol.

The mother liquors from which the uranetriol is separated are concentrated. Crystals are separated from the concentrated liquor which melt at about the same temperature as the uranetriol mentioned, but which give a depression in melting-point when mixed with it. This second, more soluble hydroxy compound is obtained in amounts of six mgms. per gallon of urine. It is apparently a pregnanetriol and can be purified further by converting it into its acetate with acetic anhydride, crystallizing the pure acetate from an organic solvent such as ethanol, and then hydrolyzing the acetate back to pure pregnanetriol melting at 300–302° C. A mixed melting-point test with this pregnanetriol and uranetriol causes a depression in melting-point of 25 degrees. An analysis of the pregnanetriol gave the following data;

Anal. calc. for $C_{21}H_{36}O_3$: C, 74.9; H, 10.8. Found: C, 74.8; H, 10.7.

Example 2.—Preparation of acetate of uranetriol

A solution of 500 mgms. of uranetriol in 20 cc. of acetic anhydride is refluxed 30 minutes. The excess acetic anhydride is evaporated off and the residue taken up in and crystallized from dilute methanol. When crystallizing out the uranetriol, it is not as satisfactory to use absolute methanol as dilute methanol, since the acetate of uranetriol is very soluble in absolute methanol. The recrystallized acetate of uranetriol melts at 136° C.

Anal. calc. for $C_{27}H_{42}O_6$: C, 70.1; H, 9.2. Found: C, 70.4; H, 9.3.

As proof that the other tri-hydroxy compound, isolated in Example 1 and designated as a pregnanetriol, is not the same as uranetriol, the acetate of the pregnanetriol can be prepared and compared with the acetate of uranetriol. For example, a solution of 500 mgms. of pregnanetriol in 20 cc. of acetic anhydride is refluxed for 30 minutes. The excess acetic anhydride is evaporated off and the product crystallized from absolute methanol, in which it is quite insoluble. The melting-point of this acetate is 168° C. When mixed with the acetate of uranetriol, a depression in melting-point is observed.

The analysis for the pregnanetriol acetate is as follows;

Anal. calc. for $C_{27}H_{42}O_6$: C, 70.1; H, 9.2. Found: C, 70.0; H, 9.3.

Example 3.—Attempt to prepare a more pure uranetriol from its acetate

The uranetriol of Example 1 melts with slight decomposition. However, it is a pure compound, as is shown by preparation of the identical product from its pure triacetate. For example, 100 mgms. of pure triacetate of uranetriol is dissolved in 50 cc. of alcohol and an excess of potassium hydroxide solution is added. The mixture is refluxed for 30 minutes, water is added, and the solid filtered off. Upon crystallization from ethyl alcohol, the solid melts at 295–300° C.

Anal. calc. for $C_{21}H_{36}O_3$: C, 74.9; H, 10.8. Found: C, 74.6; H, 11.0.

Example 4.—Isolation of uranetriol by means of acylation

This example is carried out in the same manner as described for Example 1, up to the point where the clarified alcoholic filtrate containing the mixture of alcohols is obtained. The alcohol is evaporated from the mixture and the material treated with acetic anhydride to form the acetates of the alcohols. The excess acetic anhydride is evaporated off, the residue taken up in methanol, and the triacetate of pregnanetriol obtained in pure form upon two crystallizations from methanol. The triacetate of uranetriol is obtained by adding 30% of water to the first filtrate from the pregnanetriol and cooling. Upon recrystallizing the uranetriol triacetate, it is obtained in pure form.

Both the uranetriol and the pregnanetriol obtained in the above examples give an orange-red color accompanied by a green fluorescence when warmed with concentrated sulfuric acid. This is characteristic of the pregnanediols. Neither of the two compounds form a precipitate with alcoholic digitonin solution.

Both of the triols obtained in the above examples have an angular methyl group between rings A and B of the sterol skeleton, as indicated by the fact that when heated with platinum black under the conditions described by Hönigmann for transforming neoergosterol into dehydroxyneoergosterol, no naphthol compounds are obtained. (See Hönigmann, Annalen 511, 292 (1934).) In carrying out this test, the triols are heated to 300° C. with platinum black catalyst. In each case, the products from treatment with platinum black give no picrate when treated with picric acid solution, thus showing that no naphthol is formed.

Both of the triols form triacetates which can be hydrolyzed to the original triols, as described.

*Example 5.—Preparation of urane compounds from human pregnancy urine*

The neutral fraction from 3000 gallons of an extract of human pregnancy urine after removal of phenolic female sex hormones, pregnanediols and epi-allo-pregnanolone, for example as described in my co-pending applications, Serial No. 130,582, filed March 12, 1936, and Serial No. 151,834, filed July 3, 1937, is dissolved in a small amount of ether and 500 cc. of ligroin (B. P. 90° C.) is added. The ether is distilled off and the product allowed to stand overnight in a cool place. The ligroin layer is decanted off of an oil which precipitates out. The oil is then dissolved in 600 cc. of acetic acid and a solution of 50 grams of chromic trioxide dissolved in 200 cc. of 90% acetic acid is added at room temperature with stirring over a period of one hour. The reaction is then stirred for another hour, water added, and the product extracted with ether. The ethereal extract is washed with sodium carbonate solution and evaporated to dryness. The residue is dissolved in 500 cc. of alcohol and refluxed for one-half hour with 20 grams of betaine hydrazine chloride. Thereafter, water is added and the product extracted with ether. The aqueous layer is acidified with hydrochloric acid and heated on a steam bath. This causes solid ketone compounds to separate out and these are filtered off and distilled under a high vacuum using a mercury pump. The fraction distilling between 120° C. and 150° C. consists chiefly of allo-pregnanedione melting at 199° C. This allo-pregnanedione gives no depression in melting-point when mixed with an authentic sample of allo-pregnanedione. The fraction distilling between 170° C. and 200° C. is recrystallized from methanol several times to give a white crystalline product melting at 241–244° C. This product is practically pure uranetrione, as is proved by there being no depression in melting-point when it is mixed with an authentic sample of uranetrione, prepared as described in Example 6 by chromic acid oxidation of a pure sample of uranetriol.

Anal. calc. for $C_{21}H_{30}O_3$: C, 76.4; H, 9.1. Found: C, 76.5; H, 9.0.

*Example 6.—Oxidation of uranetriol to uranetrione*

A gram of pure uranetriol is dissolved in 25 cc. of acetic acid at room temperature and a solution of one gram of chromic trioxide in 10 cc. of 90% acetic acid is added. The mixture is allowed to stand for 45 minutes, water is added, and the oxidation product is extracted with ether. Much ether may be needed at this point, since uranetrione is sparingly soluble in ether. The ethereal solution of uranetrione is washed with sodium carbonate solution, the ether evaporated from the washed ethereal solution, and the residue crystallized from methanol and washed with a small amount of cold ether. After a final recrystallization from methanol, the uranetrione melts at 245° C. When the uranetrione product is boiled with acetic anhydride, no reaction occurs and the original trione is recovered unchanged, thus demonstrating that each of the three hydroxyl groups of the uranetriol is oxidized in this example to a ketone group.

Anal. calc. for uranetrione ($C_{21}H_{30}O_3$): C, 76.4; H, 9.1. Found: C, 76.3; H, 9.2.

Uranetrione forms a di-2,4-dinitrophenylhydrazone. Thus, a mixture of 50 mgms. of the uranetrione, 120 mgms. of 2,4-dinitrophenylhydrazine and 7–10 cc. of alcohol are warmed for a minute and four drops of hydrochloric acid added. The mixture is heated for 40 minutes, cooled, and the precipitate filtered off. The product is purified by leaching repeatedly with alcohol and then melts at 236° C. This example, wherein only two of the three ketone groups of uranetrione react with 2,4-dinitrophenylhydrazine, indicates that the third ketone group of the uranetrione is in a well-blocked position, very probably at carbon atom 11 of the sterol framework. This is also indicated by the fact that uranetrione forms a di-semicarbazone instead of a tri-semicarbazone. Uranetrione is affected by boiling with alkali, such as boiling 5% methyl alcoholic sodium hydroxide solution. These properties indicate that uranetrione may be represented by the formula,

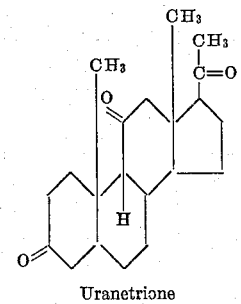

Uranetrione

In this formula, X, Y and Z of the general formula each represent the oxygenated methylene group $>C=O$.

*Example 7.—Attempt to epimerize uranetriol*

100 mgms. of pure uranetriol is refluxed with a gram of sodium metal in 50 cc. of xylene for eight hours. Amyl alcohol and water are added and the amyl alcohol-xylene layer is distilled off. The residue gives only a very slight precipitate with digitonin solution. Since the original uranetriol does not give a precipitate with alcoholic digitonin solution, these facts indicate that uranetriol belongs to the coprostane type of compounds with regard to configuration at $C_5$ of the sterol skeleton. (See article by R. E. Marker, J. A. C. S. 59, 2291 (1937).) Hence, uranetriol may be represented by the formula,

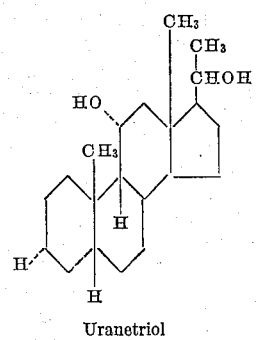

Uranetriol

*Example 8.—Preparation of urane from uranetrione*

A mixture of 0.3 gram of uranetrione, 12 grams of amalgamated zinc, 30 cc. of acetic acid and 30 cc. of hydrochloric acid is refluxed for five hours. The solution is cooled, extracted with pentane and the pentane extract washed with sodium carbonate solution and water. After evaporating the pentane, the residue is crystallized repeatedly from acetone to give pure urane of melting-point 128° C. The urane depresses the melting-point of allo-pregnane (prepared as described in example 9) to 70° C. The urane depressed the melting-point of pregnane to 55° C. The urane thus obtained is a saturated hydrocarbon and gives no test for unsaturation with a solution of bromine in carbon tetrachloride.

Anal. calc. for $C_{21}H_{36}$: C, 87.4; H, 12.6. Found: C, 87.4; H, 12.5.

*Example 9.—Preparation of allo-pregnane from allo-pregnanedione*

This is a new compound which was prepared to compare it with the new urane hydrocarbon of example 8 above.

Forty grams of 30-mesh C. P. zinc is covered with a 5% mercuric chloride solution and allowed to stand 15 minutes. Excess solution is then decanted off and the zinc washed twice with water. A solution of one gram of allo-pregnanedione in 100 cc. of acetic acid is added to the zinc amalgam along with 100 cc. of C. P. hydrochloric acid and the mixture refluxed gently. The allo-pregnane begins to separate in about 15 minutes. After the solution is refluxed for 3 hours it is cooled and extracted with pentane. The pentane extract is washed with sodium carbonate solution, and water, and then evaporated. The residue is distilled in a high vacuum at 80–90° C. The distillate is collected and is recrystallized from acetone to give allo-pregnane melting at 84° C. Pregnane melts at 83.5° C., but a mixed melting-point test with the allo-pregnane of this example depresses the melting-point of pregnane to 52–60° C.

*Example 10.—Preparation of uranedione from uranetrione*

600 mgms. of platinum oxide catalyst is added to a solution of 600 mgms. of uranetrione dissolved in 100 cc. of glacial acetic acid. The mixture is shaken with hydrogen under a pressure of 45 pounds at 70° C. for two hours. The catalyst is filtered off and the acid evaporated from the filtrate. The remaining solid contains a uranetriol which may be isomeric at $C_9$ to the uranetriol isolated from pregnancy urine. This solid is refluxed for one-half hour with 25 cc. of acetic anhydride. The acetic anhydride is evaporated from the reaction mixture and the residue, a diacetate of the new uranetriol, is dissolved in 10 cc. of acetic acid. To this acetic acid solution there is added a solution of 200 mgms. of chromium trioxide dissolved in 5 cc. of 90% acetic acid. Oxidation takes place immediately. The reaction mixture is allowed to stand for one hour and water is then added and the reaction mixture extracted with ether. The ethereal solution is washed with sodium carbonate solution until free of acids. The ether is evaporated from the washed ethereal solution to obtain a residue containing uranediol-3,20-one-11-diacetate.

The diolone diacetate residue is boiled for two hours with amalgamated zinc and a mixture of hydrochloric and acetic acids. The product dissolves at once in this solution, but upon boiling for 5 minutes comes out as an oil, indicating that the diolone diacetate is being reduced to a diol diacetate. The diol diacetate is then extracted with ether and the ethereal solution washed with sodium carbonate solution. The ether is evaporated off of the washed ethereal solution to give a residue containing uranediol-3,20-diacetate. This residue is refluxed for one hour with alcoholic potassium hydroxide solution. Water is added and the diol is extracted with ether. The ether is evaporated from the either extract to give a residue containing uranediol-3,20. This residue is dissolved in 25 cc. of acetic acid and then a solution of 500 mgms. of chromium trioxide in 10 cc. of 90% acetic acid is added. The mixture is allowed to stand for 30 minutes and then water is added. The oxidized diol product is extracted with ether and then distilled, using a mercury vapor pump, while collecting the fraction distilling between 120° C. and 150° C. This fraction is dissolved in acetone and a few drops of water are added to cause an oil to come out. The oil is separated and crystallized from methanol to give a product melting at 179° C. The remaining acetone solution from which the oil separates is reserved for further treatment to recover pregnanedione-3,20. The less soluble product melting at 179° C. is uranedione-3,20 and gives no depression in melting-point when mixed with the uranedione prepared by the oxidation of the residues of crystallization of the crude mixture of triols obtained as described in Example 1. These residues contain some uranediol as will be shown by reference to Example 13 describing preparation of uranedione-3,20 from the residues. Proof that this product is a dione and contains no hydroxyl groups is the fact that when treated with acetic anhydride it is recovered unchanged.

Anal. calc. for $C_{21}H_{32}O_2$: C, 79.7; H, 10.2. Found: C, 79.3; H, 10.2.

A few more drops of water is added to the acetone solution from separating out the oily uranedione-3,20 as described above. This causes an additional oil to come out. The oil is separated and the filtrate allowed to stand 24 hours in a refrigerator. This causes crystals to come out which are filtered off and recrystallized from 50% acetone. The crystals melt at 118° C. and give no depression in melting-point when mixed with pregnanedione melting at 120° C.

In this example, some of the material apparently undergoes an inversion in the ring system in order for the pregnanedione to be formed along with the uranedione. It seems likely that any inversion occurred during hydrogenation.

*Example 11.—Uranedione by oxidation of a carbinol fraction of pregnancy urine*

The filtrate from crystallizing out the triols as described in Example 1 is evaporated to give a yellow oil. This oil is dissolved in acetic acid, cooled to 20° C. and oxidized with an equal weight of chromium trioxide in 90% acetic acid. The oxidation is carried out by mixing the solutions at 20° C. and allowing them to stand at this temperature for one hour. The solution is then diluted with water, extracted with ether, and the ethereal extract washed with water and sodium carbonate solution. The washed ethereal solution is evaporated to dryness. The residue is crystallized from ethyl alcohol and consists of a mixture of uranetrione and uranedione. The trione and the dione are separated by fractionally crystallizing them from ethyl alcohol and methyl alcohol to yield uranedione-3,20, melting at 182° C.

It gives no depression in a mixed melting-point test with a sample of the uranedione prepared as given in Example 10.

The uranedione-3,20 gives a depression in melting-point when mixed with uranetrione melting at 245° C. The uranedione contains no hydroxyl group, as is proved by refluxing it with acetic anhydride, from which it can be recovered unchanged. The uranedione of this example analyzes practically the theoretical values of carbon and hydrogen required for $C_{21}H_{32}O_2$.

The products of the invention can be obtained by numerous methods, and various changes can be made in the details of the examples given above, so that those skilled in the art can obtain substantially the same results. For example, in place of using acetic anhydride as an acylating agent, other anhydrides, or even acid halides, of alkyl- and also aryl-carboxylic acids can be used to obtain an ester group in place of hydroxyl and capable of hydrolysis to give a hydroxyl group.

In forming the halogen derivatives of the invention, the corresponding urane compounds having one or more of the carbon atoms $C_3$, $C_{11}$ and $C_{20}$ substituted by a hydroxyl group may be treated with halogenating agents such as phosphorus halides, thionyl halides, etc.

The ethers corresponding to the hydroxy uranes can be obtained by any of the known methods for converting a secondary alcohol group into an ether, such as treatment of an alkali metal alcoholate or phenolate with an alkyl halide.

What I claim as my invention is:

1. Urane compounds of formula,

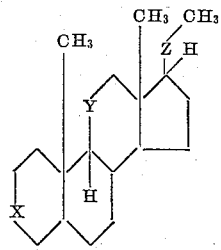

where X, Y, and Z represent carboxylic acid-esterified secondary alcohol groups.

2. Uranetriol triacetate having a melting point of approximately 136° C.

3. Urane compounds of formula,

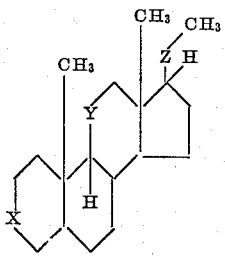

where X, Y and Z represent members of the methylene and substituted methylene group consisting of $>CH_2$, $>C=O$, and $>CHR$, R being a member of the group hydroxyl and a group which is converted by hydrolysis into hydroxyl.

4. Urane compounds of formula,

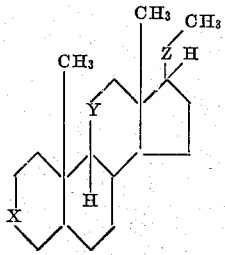

where X, Y and Z represent oxygenated methylene groups.

5. Method for the production of urane compounds which comprises crystallizing a syrupy, neutral, non-phenolic carbinol fraction of pregnancy urine to obtain a mixture of crystalline hydroxy urane compounds and crystalline hydroxy pregnane compounds, dissolving said mixture in an organic solvent to form a solution of the mixture and separately crystallizing hydroxy urane compounds and hydroxy pregnane compounds from the solution.

6. Method for the production of urane compounds which comprises crystallizing a syrupy, neutral, non-phenolic carbinol fraction of pregnancy urine to obtain a mixture of crystalline hydroxy urane compounds and crystalline hydroxy pregnane compounds, acylating the mixture, dissolving the acylated mixture in an organic solvent to form a solution of the acylated mixture, and separately crystallizing hydroxy urane compounds and hydroxy pregnane compounds from the solution.

7. In a method for the production of urane compounds, the step which comprises crystallizing a syrupy, neutral, non-phenolic carbinol fraction of pregnancy urine to obtain a mixture of crystalline hydroxy urane compounds with crystalline hydroxy pregnane compounds.

8. Uranetriol having a melting point of approximately 300° C.

9. Uranetrione having a melting point of approximately 245° C.

RUSSELL EARL MARKER.